United States Patent Office 2,706,169
Patented Apr. 12, 1955

2,706,169

FLASH DISTILLATION OF 2,4-TOLYLENE DIISOCYANATE

Theodore R. Beck, Wilmington, Del., assignor to E. I. du Pont de Nemours and Company, Wilmington, Del., a corporation of Delaware No Drawing. Application March 4, 1954, Serial No. 414,232

2 Claims. (Cl. 202—53)

This invention relates to a distillation process, and more particularly to a process of recovering 2,4-tolylene diisocyanate from the still residue that remains after the normal distillation of the 2,4-tolylene diisocyanate prepared by the reaction of phosgene and 2,4-tolylene diamine.

When 2,4-tolylene diisocyanate is prepared by the phosgenation of 2,4-tolylene diamine in an inert solvent, such as ortho-dichlorobenzene, the solvent is distilled from the reaction mass and then the 2,4-tolylene diisocyanate is distilled. There remains behind as a still heel a somewhat viscous tar which contains a substantial quantity of 2,4-tolylene diisocyanate. It is highly desirable to recover the tolylene diisocyanate remaining in the tar, as it represents a significant portion of the overall yield.

It is therefore an object of this invention to provide a method whereby tolylene diisocyanate may be recovered from the viscous, tarry still residue in a simple and economical manner, more particularly by a flash distillation procedure under controlled conditions.

When 2,4-tolylene diisocyanate is prepared by the phosgenation of 2,4-tolylene diamine there usually results a small quantity of tarry substance from which it is difficult to remove the residual 2,4-tolylene diisocyanate. Normally the phosgenation mass is first stripped to remove any excess phosgene and HCl which remain in the solution and then the solvent is distilled off. On distillation of the 2,4-tolylene diisocyanate under reduced pressure, there remains as a distillation heel a viscous, tarry residue containing about 50% of 2,4-tolylene diisocyanate. It is impractical to reduce the concentration of 2,4-tolylene diisocyanate in this tar by ordinary distillation below about 40% to 45% concentration. The amount will vary, depending on the viscosity of the tar, and may be from about 40% to about 60% of 2,4-tolylene diisocyanate. This tarry residue is quite viscous and is difficult to handle. If an attempt is made to distill the residual 2,4-tolylene diisocyanate from the tar by the usual distillation, the tar is decomposed in the distillation vessel and is very difficult to remove therefrom. Such procedure requires stopping the operation and cleaning out the vessel manually. This of course results in both a loss of production and an added expense in handling.

According to the present invention, the 2,4-tolylene diisocyanate may be recovered from the distillation heel or viscous, tarry residue containing from 40% to 60% of the 2,4-tolylene diisocyanate, by heating this residue under pressure at from 200° to 300° C. and introducing this superheated mixture into a zone maintained at a pressure substantially lower than the boiling point of the 2,4-tolylene diisocyanate, whereby the 2,4-tolylene diisocyanate in substantially pure form is vaporized and recovered by condensation while the residue is converted to a dry, friable solid which can be readily disposed of.

The lower limit of concentration of 2,4-tolylene diisocyanate in the distillation heel is set by the ability to handle a viscous mass in operating equipment. Ordinarily the viscosity of a 40% to 45% 2,4-tolylene diisocyanate-tar mixture is about 1,000 centipoises at 130° to 140° C. Mixtures which are much more viscous than this are not readily handled. On the other hand, mixtures containing more tolylene diisocyanate can be readily handled. It is usually not practical to leave more than about 60% of tolylene diisocyanate in the tarry residue, since up to that amount can readily be removed by ordinary distillation. A factor in the process of this invention is that the vaporization of the 2,4-tolylene diisocyanate in the mixture depends on the latent heat of vaporization, which heat is introduced into the mixture during the preheating cycle. Since the diisocyanate cannot safely be heated over about 300° C., more than about 60% tolylene diisocyanate cannot be vaporized by a flash distillation with the heat thus stored up.

If the viscosity of the tolylene diisocyanate-tar mixture is plotted against the concentration of tolylene diisocyanate in the tar, it will be found that the viscosity increases gradually until the concentration of tolylene diisocyanate falls to about 45%, at which point the viscosity increases very rapidly so that a more or less sharp break occurs in the curve so plotted. Consequently, at concentrations of tolylene diisocyanate in the still residue only slightly below 40%, the viscosity rises very abruptly.

The temperature to which the tolylene diisocyanate-tar mixture must be heated prior to its release into the vacuum chamber for the flash distillation of this invention depends on the concentration of tolylene diisocyanate in the mixture. Thus, with a still residue containing 60% tolylene diisocyanate a temperature of about 300° C. should be used, while with concentrations of tolylene diisocyanate in the order of 40% to 45% a temperature of about 200° C. is satisfactory.

The pressure in the vacuum chamber into which the superheated mixture is released is of course dependent upon the concentration of tolylene diisocyanate in the mixture and the temperature to which it has been heated. If the temperature is low, then a low pressure must be utilized. On the other hand, when the temperature is in the vicinity of 300° C., a higher pressure of about 150 to 200 mm. is satisfactory. Generally speaking, pressures not greater than about 10 mm. of mercury are preferred.

The residue which remains after the tolylene diisocyanate is flash distilled out of the mixture is a dry, friable material. This falls to the bottom of the vacuum chamber. A simple paddle or anchor agitator may be run in the vessel in order to pulverize this residue. The residue is naturally rather porous in form since it puffs up as the tolylene diisocyanate is flashed from it. When the operation is run as a batch operation, the feed of tolylene diisocyanate-tar mixture is discontinued and the vessel is opened and the residue is removed. However, the whole operation can be run continuously by continuously introducing the tolylene diisocyanate-tar mixture into the vacuum chamber, flash distilling, as mentioned before, out of the vessel and removing the dry residue from the bottom of the vessel through a suitable vacuum type discharge arrangement. See, for instance, U. S. Patents 2,087,788, 1,080,602 and 1,949,427.

Conventional chemical equipment may be used in carrying out this process. Any satisfactory holding vessel may be used to store the tolylene diisocyanate-tar mixture ready to be fed to the preheating system. Ordinarily a positive displacement pump is preferred for feeding the material to the preheater. The preheater may be any suitable form of heat exchange in which the tar flows through and is surrounded by a heat exchange medium to bring the temperature of the tar to the required temperature. The heat exchange medium may be steam under pressure or it may be any other liquid by which heat exchange may be effected. The vacuum chamber into which the tar-isocyanate mixture is flashed may be any suitable vessel. Preferably it is sufficiently large to permit the easy disengagement of the tolylene diisocyanate vapors from the residual tar. Any convenient means, such as a valve, may be used for releasing the tolylene diisocyanate-tar mixture from the preheated into the evacuated chamber. Since the dry tar is in the form of a rather porous mass, it consequently occupies a considerable volume. In order to avoid building up too large a volume of residue in the vessel, it is desirable to reduce the size by some means such as a simple agitator in the vessel. Any other suitable means may be used. The tolylene diisocyanate in vapor form passes from the vacuum chamber to any suitable condenser through which the vacuum in the system is maintained by a suitable vacuum pump.

The following examples are given to more definitely illustrate the invention. The parts used are by weight, unless otherwise specified.

*Example 1*

191 parts of a mixture of 50% 2,4-tolylene diisocyanate and 50% tar from the usual distillation of 2,4-tolylene diisocyanate was placed into a pressure vessel equipped with a bottom outlet and heated to 250° C. The bottom outlet was connected to a vacuum vessel through a valve. A take-off condenser was attached to the vacuum vessel and vacuum was applied to a receiver attached to the condenser. The system was evacuated to a pressure of 4 mm. of mercury. The evacuated vessel was heated to 120° C. to avoid condensation of the flashed tolylene diisocyanate on the walls of the vessel. At the temperature of 250° C. a pressure of 60 lbs. p. s. i. gauge was shown on the pressure feed vessel. The mixture was then allowed to flow slowly through the valve from the feed vessel into the evacuated vessel whereupon the tolylene diisocyanate was flash-evaporated and was condensed in the condenser and collected in the receiver. The total amount of 2,4-tolylene diisocyanate recovered was 78 parts and the residue recovered was 103 parts. The residue collected in the bottom of the vacuum vessel was in the form of a friable black mass. It contained 4% of 2,4-tolylene diisocyanate.

*Example 2*

In this example an agitator was inserted into the vacuum vessel so as to break up the friable residue which separated to the bottom of the vessel. The agitator was a simple anchor type agitator turning at about 60 R. P. M. 195 parts of a mixture containing 55% of 2,4-tolylene diisocyanate and 45% tar was placed in the pressure vessel and heated to 290° C., at which temperature the pressure was 210 pounds per square inch gauge. The vacuum vessel was evacuated to a pressure of 6 mm. of mercury and the tolylene diisocyanate-tar mixture was allowed to flow through the valve slowly into the evaucated vessel. In this particular instance, the walls of the vacuum vessel were held at 180° C. The tolylene diisocyanate flashed off, and the friable porous residue was broken into a powder by the action of the agitator. 80 parts of 2,4-tolylene diisocyanate were recovered, and 90 parts of residue were recovered which contained 3% 2,4-tolylene diisocyanate.

As illustrated in the above examples the tar residues are so completely freed from the solvent materials that they are converted to substantially dry residues which can be readily broken up and disposed of, which is quite unexpected in view of the fact that previous distillations indicated that to remove the tolylene diisocyanate to this extent usually resulted in thick, viscous tarry residues of such character that they could not be handled in commercial apparatus.

I claim:

1. The process of recovering 2,4-tolylene diisocyanate from the residual tarry mass resulting from its distillation, which comprises heating a 2,4-tolylene diisocyanate-tar mixture containing from 40% to 60% of 2,4-tolylene diisocyanate under pressure to a temperature of from 200° to 300° C., introducing the superheated mixture into a zone maintained at a pressure substantially lower than the boiling point of the 2,4-tolylene diisocyanate, and recovering the purified 2,4-tolylene diisocyanate from the vapor phase.

2. The process of recovering 2,4-tolylene diisocyanate from the residual tarry mass resulting from its distillation, which comprises heating a 2,4-tolylene diisocyanate-tar mixture containing from 40% to 60% of 2,4-tolylene diisocyanate under pressure to a temperature of from 200° to 300° C., introducing the superheated mixture into a zone maintained at a pressure substantially lower than the boiling point of the 2,4-tolylene diisocyanate, and recovering the purified 2,4-tolylene diisocyanate from the vapor phase and the remaining tar residue as a friable solid.

No references cited.